United States Patent [19]

Suwala et al.

[11] 4,209,562

[45] Jun. 24, 1980

[54] LATEX BLEND BINDER COMPOSITIONS FOR ASBESTOS SHEETS

[75] Inventors: David W. Suwala, Flanders; Eugene S. Barabas, Watchung, both of N.J.

[73] Assignee: GAF Corporation, New York, N.Y.

[21] Appl. No.: 917,476

[22] Filed: Jun. 21, 1978

Related U.S. Application Data

[63] Continuation of Ser. No. 770,199, Feb. 18, 1977, abandoned.

[51] Int. Cl.$^2$ .................................................. C08K 7/12
[52] U.S. Cl. ............................... 428/271; 260/29.7 W; 260/42.47; 260/42.55
[58] Field of Search ........... 260/29.7 W, 42.55, 42.47; 428/271

[56] References Cited

U.S. PATENT DOCUMENTS

| | | | |
|---|---|---|---|
| 3,035,004 | 5/1962 | Glavis | 260/29.7 W |
| 3,652,497 | 3/1972 | Junas | 260/29.7 W |
| 3,660,148 | 5/1972 | Heron | 428/271 |
| 3,894,980 | 7/1975 | De Tommaso | 260/29.7 W |
| 3,968,072 | 7/1976 | Barna | 260/42.47 |

FOREIGN PATENT DOCUMENTS 870994 6/1961 United Kingdom.

Primary Examiner—Paul R. Michl
Attorney, Agent, or Firm—W. C. Kehm; J. Magee; J. J. Ward

[57] ABSTRACT

A binder composition for asbestos fibers comprises a latex blend in which the dispersed phase comprises (1) from about 80 to 99.5 weight percent of a synthetic rubber and (2) from about 0.5 to 20 weight percent of a highly carboxylated polymer. The highly carboxylated polymer is a copolymer or terpolymer containing (1) an $\alpha,\beta$-unsaturated carboxylic acid, (2) an alkyl ester of an $\alpha,\beta$-unsaturated carboxylic acid, and optionally (3) an ethylenically unsaturated organic monomer which is copolymerizable with monomers (1) and (2) to form a stable latex.

19 Claims, 1 Drawing Figure

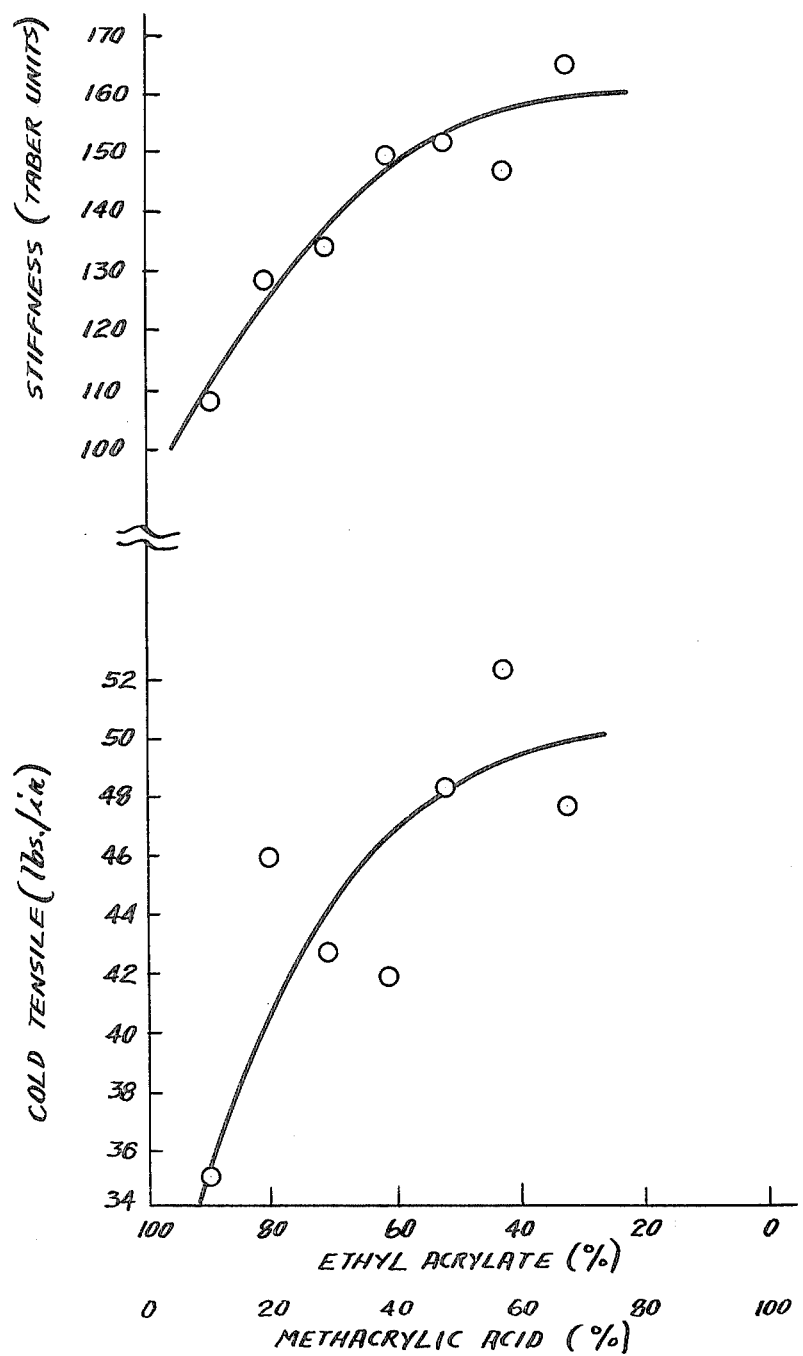

LATEX BLEND BINDER COMPOSITIONS FOR ASBESTOS SHEETS

This is a continuation of application Ser. No. 770,199, filed Feb. 18, 1977, now abandoned.

FIELD OF THE INVENTION

This invention relates broadly to new binder compositions for asbestos fibers and aggregates and to asbestos sheets prepared therefrom. The binder compositions are latex blends wherein the dispersed phase comprises (1) from about 80 to about 99.5 weight percent of a conventional rubber binder and (2) from about 0.5 to about 20 weight percent of a highly carboxylated polymer. The highly carboxylated polymer latex comprises a copolymer or terpolymer of an $\alpha,\beta$-unsaturated carboxylic acid, an alkyl ester of an $\alpha,\beta$-unsaturated carboxylic acid and optionally, an ethylenically unsaturated organic termonomer as defined herein. The asbestos sheets produced from blending asbestos fibers with this binder composition are uniformly coated with synthetic rubber.

DESCRIPTION OF THE PRIOR ART

The first step in the preparation of a rubber-bonded asbestos sheet is to bring together a synthetic rubber latex and an asbestos slurry which was subjected to high mechanical shear. It has been the object of prior art to deposit uniformly and evenly a coating of synthetic rubber particles with a slight negative charge onto the cationic chrysotile fibers. Various methods of controlling or improving this precipitation have been proposed including the use of chelating and sequestering agents, polymeric dispersing agents and crocidolite (an asbestiform mineral with negative charge). These methods have been proven only moderately successful at accomplishing their objective since it is difficult even in the laboratory to completely separate the individual fibrils from the compact fiber bundles and aggregates of the chrysotile mineral.

Generally, the slurry of asbestos fiber and aggregates coated with synthetic rubber is formed into a sheet on conventional papermaking machinery, i.e., a Fourdrinier wire or cylinder machine. The water is removed from the slurry by suction and the rate at which it drains governs the speed of the papermaking machinery. In the case of a slurry containing completely dispersed chrysotile fibers, the fibers lay down parallel to the plane of the sheet forming a tight, impermeable mat and preventing easy drainage. Larger aggregates or clumps of chrysotile lay down loosely with channels and voids between them allowing fast drainage of the water. Thus, most water-laid, rubber-bonded asbestos sheet is by necessity prepared from incompletely dispersed asbestos and contains a considerable amount of chrysotile clumps. These clumps, not having been dispersed, contain fiber in their cores which is not coated with synthetic rubber.

It is therefore a primary object of this invention to provide a binder composition which can permeate any undispersed asbestos clumps and strengthen the interfiber bonding. It is also an object of this invention to provide an improved process for preparing water-laid, rubber bonded asbestos sheets with improved strength properties. These and other objects of the invention will become apparent from a reading of the following disclosure.

SUMMARY OF THE INVENTION

This invention provides a new binder composition for asbestos fibers, said composition being a latex blend wherein the dispersed phase comprises from about 80 to about 99.5 weight percent of a conventional synthetic rubber binder and (2) from about 0.5 to about 20 weight percent of a highly carboxylate polymer. The highly carboxylated latex comprises a copolymer or terpolymer containing (a) from about 30 to about 85 parts by weight of an unsaturated carboxylic acid of the formula.

in which R is methyl or ethyl, (b) from about 5 to about 50 parts by weight of an unsaturated carboxylic acid ester of the formula

in which $R_1$ is alkyl of from 1 to 8 carbon atoms, preferably alkyl of from 1 to 4 carbon atoms, and $R_2$ is hydrogen, methyl or ethyl, and (c) from 0 to about 20 parts by weight of an ethylenically unsaturated organic monomer which is copolymerizable with monomers (I) and (II) above to form a stable latex.

The termonomer (3), which is critical in obtaining terpolymers of the proper characteristics for this invention, can be represented by the formula

wherein $R_3$ is hydrogen, methyl, ethyl, or halogen such as chlorine, bromine, iodine or fluorine, $X_1$ is hydrogen or $C_1$–$C_{18}$ alkoxycarbonyl, and $X_2$ is a member selected from the group consisting of aryl, aminocarbonyl, cyano, $C_1$–$C_4$ alkoxy, carboxy, $C_1$–$C_{18}$ alkoxycarbonyl, halo, acyl, aldehyde, keto, isocyanato, $C_3$–$C_9$ heterocyclic, $C_1$–$C_4$ alkyl, $C_2$–$C_4$ alkenyl, halomethylene, acetomethylene, sulfo, $C_1$–$C_4$ alkoxysilane and hydrogen.

The highly carboxylated latex and the conventional rubber binder latex are blended to provide an excellent binder composition for use in the manufacture of asbestos felts and sheets. The product is characterized by superior interfiber bonding. Furthermore, the drainage of water from asbestos slurries containing the latex blends of this invention is greatly accelerated.

DESCRIPTION OF THE DRAWINGS

The drawing is a plot showing the cold tensile and stiffness of asbestos sheets manufactured from binder compositions containing highly carboxylated copolymers. Details are found below in Example XIX.

DESCRIPTION OF THE PREFERRED EMBODIMENTS

Asbestos sheets suitable for use as a substrate for vinyl flooring are generally produced with fibers ranging in length from 1/32 to ⅛ inch. Fibers with these lengths are classified by the Quebec Asbestos Producers Association as Grades 5, 6 and 7. These grades and mixtures thereof are generally used in the manufacture of asbestos sheets but other fibers, e.g., cellulose, are occasionally introduced.

The desired amount of asbestos fiber, generally from 0.3 to 8% by weight of the total slurry, is added to the water. The slurry is then refined in a Hydropulper, Jordan engine, beater, disc refiner or the like. The water at this point is hot (about 38° C.) and it is recycled from the wet end of the papermaking machinery. After the fiber bundles are broken down the slurry is transferred to a tank where binder latex is added. The mixture is then formed into sheets and the sheets are then pressed and dried.

The conventional rubber binder latex used in the latex blends of this invention is typically and optionally carboxylated styrene-butadiene latex containing from about 50 to about 70 weight percent of styrene, from about 30 to about 50 weight percent of butadiene and from 0 to about 5 weight percent of a carboxylic acid monomer such as, for example, acrylic acid, methacrylic acid, fumaric acid or itaconic acid. Alternatively, the latex may be a copolymer of acrylonitrile and butadiene, a neoprene latex, or other synthetic rubber latices known in the art. Additionally, the latices may also contain emulsifiers, chain transfer agents, preservatives and other modifiers which are well known to those skilled in the art.

The highly carboxylated latices are prepared by a low temperature, single stage emulsion polymerization process described more fully below. The polymers resulting from this polymerization comprise the repeating units:

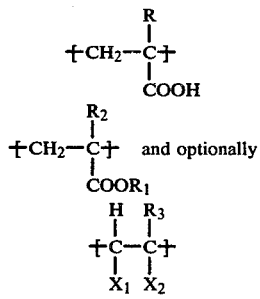

wherein R, $R_1$, $R_2$, $R_3$, $X_1$ and $X_2$ are as defined hereinabove.

In a preferred mode of practice of the present invention, the highly carboxylated latex should contain the following ingredients in the following proportions:

(1) From about 30 to about 85 percent, preferably from 50 to 80 percent in copolymer latices and from 50 to 70 percent in terpolymer latices, by weight of an $\alpha,\beta$-monoethylenically unsaturated carboxylic acid of Formula I, preferably methacrylic acid, ethacrylic acid or a mixture thereof with other unsaturated carboxylic acids such as acrylic acid. The amount of such other unsaturated carboxylic acids which can be employed in such mixtures can vary up to about 50% or more of such mixtures depending upon the concentration and hydrophobic nature of the carboxylic acid ester units in the resulting polymer. As the concentration and/or hydrophobic nature of the ester increases, increasing amounts of such other unsaturated carboxylic acids, e.g., acrylic acid, can be employed to the extent that a stable latex can still be obtained.

(2) From about 5 to about 50 percent, preferably from 20 to 50 percent in copolymer latices, and from about 20 to about 30 percent in terpolymer latices, by weight of at least one alkyl ester of an $\alpha,\beta$-unsaturated carboxylic acid, a predominant portion of said ester having 1 to 8 carbon atoms in the alkyl moiety.

(3) From 0 to about 20 percent, preferably from about 3 percent to 8 percent, by weight, of an ethylenically unsaturated organic termonomer of Formula III. The terpolymer of Formula III includes such illustrative monomers as styrene, vinyltoluene, chlorostyrene, acrylamide, methacrylamide, N-isopropyl acrylamide, acrylonitrile, methacrylonitrile, vinylidene cyanide, methylvinyl ether, ethylvinylether, butyl vinyl ether, halfacid ethylmaleate, halfacid 2-ethylhexyl maleate, halfacid ethylfumarate, halfacid ethylitaconate, diethylmaleate, dibutyl maleate, diethyl fumarate, vinylchloride, vinylidene chloride, vinylbromide, vinylidene fluoride, vinylacetate, vinylpropionate, vinylchloroacetate, vinylbenzoate, vinylthioacetate, acrolein, methacrolein, methylvinylketone, ethylvinylketone, isopropenyl methyl ketone, vinyl isocyanate, isopropenyl isocyanate, vinyl isothiocyanate, N-vinyl-2-pyrrolidone, N-vinyl-2-oxazolidinone, vinylfurane, indene, 2,3-dihydrofurane, vinyl succinimide, butadiene, isoprene, chloroprene, allyl chloride, allylacetate, allyl laurate, methallyl chloride, vinyl sulfonic acid, sodium vinyl sulfonate, vinyltriethoxy silane, vinyl triisopropoxy silane, ethylene, propylene, and the like.

It is to be understood that all the foregoing percentages are based on the total copolymer weight, and they have to total 100%.

Besides the aforedescribed termonomer types, small amounts of a bifunctional ethylenically unsaturated crosslinking monomer may also be added to the mixture. This monomer has to be capable of polymerizing under free radical conditions so as to covalently bond different chains of the polymer. Polyfunctional monomers, such as divinyl benzene, polyethyleneglycoldimethacrylate, methylene-bis-acrylamide, etc., are illustrative examples. Other monomers, which can render the polymer curable (through heat treatment) or otherwise crosslinkable, such as methylolacrylamide, glycidylmethacrylate, epoxybutadiene, etc., can also be used as comonomers.

The preferred method of polymerization is essentially a free radical-catalyzed batch polymerization of monomers which are dispersed in the aqueous phase with suitable surface active agents and protective colloids. A redox initiator system is recommended. The exothermic polymerization is carried out under an inert gas and is complete after a period of about 10 minutes to about 2 hours. The particles of the resulting latex are extremely small in size and have a high anionic surface charge. The emulsions typically have from about 10 percent and preferably from about 20 percent to about 50 percent solids content. The average particle size of the emulsion may be from 500 Ångstroms or smaller to about 3000 Ångstroms or greater. The reaction temperature applied depends, in the first place, on the polymerization catalyst and the monomers used. In general, the polymerization is carried out at a temperature in the range of from 5° C. to 120° C. When the catalyst is a redox system, the recommended initial temperature range is 5° C. to 80° C., advantageously, 15° C. to 60° C.

It is advisable to operate with exclusion of oxygen, for example under a neutral gas such as nitrogen, argon, and the like. Sometimes it may also be advantageous to run the reaction under elevated or reduced pressure.

The polymerization can be run conveniently by a single stage procedure, whereby all the ingredients are charged to the reactor at the same time. Since the polymerization reaction is exothermic, the initiation thereof can be evidenced by the increasing temperature resulting from the addition of the reactants. When the polymerization has proceeded to the extent that the consumption of the monomers is practically complete, the terminal point is indicated by the cessation in the rise of the temperature, followed by a temperature drop. The time period necessary for the aforedescribed operation can range from about 10 minutes to about 2 hours.

Chain transfer agents can be used to regulate the average molecular weight of the polymer. Preferred agents are mercaptans such as t-dodecylmercaptan.

The preparation of the terpolymers is carried out in an emulsion system. The term "emulsion" as used herein is intended to mean a true colloidal dispersion of the terpolymers in water.

Polymerization is effected in the presence of a catalyst or initiator, preferably one which serves as a thermally activated source of free radicals. Among such catalysts may be mentioned peracetic acid, hydrogen peroxide, persulfates, perphosphates, perborates, percarbonates, etc. The preferred catalyst is ammonium persulfate, as it provides efficient reaction rates and contains a fugitive cation. The amount of initiator used is normally about 0.03 to about 3.0 percent by weight of the total monomers and preferably from about 0.25 to about 0.5 percent. Preferably the initiator is a redox combination of the water soluble persulfate as the oxidizing component and a hydrosulfite, e.g., sodium hydrosulfite, as the reducing component of the redox combination. Water soluble bisulfites, metabisulfites or thiosulfates, reducing sugars, formaldehyde sulfoxalate, etc., may be used in lieu of the hydrosulfites. Other typical redox combinations, such as sodium azide and ceric ammonium sulfate, titanium trichloride and hydroxylamine, and the like may also be used. Generally useful proportions of the indicated persulfatehydrosulfite system are from about 0.01 to about 1.0 percent for the oxidizing component and from about 0.15 to about 1.5 percent for the reducing component based on the amount of monomers.

The redox combination can be further activated by the presence of polyvalent metal ions at the lower oxidation stage, e.g., ferrous sulfate, cuprous sulfate and the like. The preferred amount of these metal salts may be between 5 ppm and 10 ppm by weight, based on the total amount of the monomers.

The aqueous medium for polymerization contains some emulsifiers to help to disperse the monomers in the aqueous medium, and to protect the particles formed. Salts of the higher molecular weight sulfonic acids, e.g., alkyl aryl sodium sulfonates, are eminently suitable for the purpose, though other surfactants may also be used with good results.

The amount of surfactant employed can be varied considerably, but ordinarily from about 0.1 percent to about 10 percent, and more particularly from about 0.2 percent to about 1.0 percent, by weight, based on the total weight of the comonomers, will be used. Some additive such as alcohols can also be used in order to enhance the solubilization of the water insoluble ingredients. The concentration of these materials can be varied between 0.1 percent and 2.0 percent by weight, based on the weight of the comonomers. The emulsion can also contain a small amount of a protective colloid, such as water soluble cellulose derivatives, poly (vinylpyrrolidone), alkali metal polyacrylates, water soluble alginates, and the like. The amount of such a colloid used can range, for example, from about 0.1 percent to about 2 percent and more particularly from about 0.5 percent to about 1 percent.

Only a small amount of highly carboxylated latex is required to produce significant improvements in the physical properties of the slurry and the finished sheet. The highly carboxylated latex may be blended with conventional rubber binder latex provided that the two are compatible. Such blends may contain as little as 0.5 parts to as much as 20 parts of the highly carboxylated additive polymer in 100 parts of the dry weight. The preferred amount of highly carboxylated polymer is from about 1 part to about 8 parts in 100 parts of the total polymer dry weight. The resulting slurry with asbestos and 15 parts of binder will contain from about 20 ppm to about 800 ppm of highly carboxylated polymer. The exact amount of highly carboxylated polymer needed to achieve the desired performance characteristics will depend on the properties of the binder latex with which it is blended.

While not wishing to be bound by any theoretical considerations or mechanisms, it is currently believed that the effectiveness of the latices employed in the present invention in improving the properties of the asbestos felt, lies in the highly charged character of said latices, due to the high concentration of carboxyl groups. The presence of the termonomer as defined herein improves the drainage of the asbestos felt significantly. This is believed to be attributable to the ability of the termonomer to separate vicinal carboxyl groups, thus increasing the number of dissociated carboxyl groups and diminishing the number of inactive ion-bound carboxyls. The termonomer does that through its reactivity with the two comonomers.

Latices for asbestos felts are evaluated by preparing hand sheets and subjecting them to conventional paper testing. A blend of 25 parts of Quebec grade 5 and 75 parts of Quebec grade 7 asbestos is dispersed in water (38° C.) to about a 5% consistency. The slurry is agitated using a 2.5 inch split disc impeller at 1000 rpms for 8 minutes. Sufficient latex is added to give 15 parts of polymer in 100 parts of asbestos and the stirring continued for 7 minutes. The resulting slurry is uniform and homogeneous and suitable for forming sheets in a Williams sheet mold after being diluted to a 3% consistency. The sheets are then pressed on a Williams hydraulic press and dried on the Williams standard sheet dryer.

Water (35° C.) is added to the stock to bring the consistency to 2%. The drainage of water from the asbestos slurries is measured with a Schopper-Riegler freeness tester. Low numbers indicate fast drainage.

The tensile strengths are determined by pulling 1 inch strips of the sheet on an Instron 1130 test instrument at a crosshead speed of 2 in/min. A cold test is done at room temperature (21° C.); a hot test is done by heating the strip to 190° C.; a plasticizer tensile is run after the sample is soaked for 18 hours in butyl benzyl phthalate to simulate the plasticizers which may be used in some vinyl coatings in flooring manufacture.

For a fuller understanding of the nature and objects of this invention, reference may be made to the following examples. These examples are given merely to illustrate the invention and are not to be construed in a limiting sense. All parts, percentages, proportions and other quantities are by weight unless otherwise indicated.

EXAMPLE I

Preparation of 90/10 Ethylacrylate-Methacrylic Acid Copolymer

Apparatus: 3 liter resin kettle, equipped with mechanical stirrer, reflux condenser, thermometer and gas inlet tube.

Procedure: Under a blanket of nitrogen, the following ingredients of the reaction were charged, with agitation, in the following order and amounts:
1694.2 g distilled water
8.6 g Siponate DS-10, 25% (Product of Alcolac Co.)
6.4 g n-butanol
42.9 g methacrylic acid
386.1 g ethylacrylate
0.123 g divinylbenzene (60%)
1.71 g of a 10% ammonium persulfate solution
2.86 g of a 0.1% ferrous sulfate solution At this point, the agitation was stopped, and 2.14 g. of a 10% solution of concentrated sodium hydrosulfite (Lykopon) was introduced. Five minutes later, slow agitation was started, as a slight temperature rise (from 19° C. to 21° C.) signaled that the reaction had already begun. Five minutes later, at 26° C., the speed of the agitation was adjusted to 150 rpm. After that the temperature rose steadily, and it peaked 10 minutes later at 56° C. After that the system allowed to cool to room temperature, and the product—a free flowing milky latex—was discharged through a 100 mesh screen.

EXAMPLE II

Emulsion copolymer is prepared by the process described in Example I, except that the ratio of methacrylic acid and ethylacrylate is 20/80 by weight.

EXAMPLE III

Emulsion copolymer is prepared by the process described in Example I, except that the ratio of methacrylic acid and ethylacrylate is 30/70 by weight.

EXAMPLE IV

Emulsion copolymer is prepared by the process described in Example I, except that the ratio of methacrylic acid and ethylacrylate is 40/60 by weight.

EXAMPLE V

Emulsion copolymer is prepared by the process described in Example I, except that the ratio of methacrylic acid and ethylacrylate is 50/50 by weight.

EXAMPLE VI

Emulsion copolymer is prepared by the process described in Example I, except that the ratio of methacrylic acid and ethylacrylate is 60/40 by weight.

EXAMPLE VII

Emulsion copolymer is prepared by the process described in Example I, except that the ratio of methacrylic acid and ethylacrylate is 70/30 by weight.

EXAMPLE VIII

Emulsion terpolymer is prepared by the process described in Example I. The polymer consists of methacrylic acid, ethylacrylate and a termonomer. The percentages of the ingredients are 70, 28, and 2 by weight, respectively. The termonomer is acrylamide.

EXAMPLE IX

Emulsion terpolymer similar to that described in Example VIII, is prepared, except that the termonomer is acrylonitrile, and percentages of the ingredients are 66, 28 and 6, respectively.

EXAMPLE X

Emulsion terpolymer similar to that described in Example IX, is prepared, except that the termonomer is n-butylvinyl ether.

EXAMPLE XI

Emulsion terpolymer similar to that described in Example IX, is prepared, except that the termonomer is chlorostyrene.

EXAMPLE XII

Emulsion terpolymer similar to that described in Example IX, is prepared, except that the termonomer is diethylmaleate.

EXAMPLE XIII

Emulsion terpolymer similar to that described in Example IX, is prepared, except that the termonomer is 2-ethylhexyl halfacid maleate.

EXAMPLE XIV

Emulsion terpolymer similar to that described in Example IX is prepared, except that the termonomer is isobutyl vinyl ether.

EXAMPLE XV

Emulsion terpolymer similar to that described in Example IX is prepared, except that the termonomer is styrene.

EXAMPLE XVI

Emulsion terpolymer similar to that described in Example IX is prepared, except that the termonomer is triethoxyvinylsilane.

EXAMPLE XVII

Emulsion terpolymer similar to that described in Example IX is prepared, except that the termonomer is vinyl acetate.

EXAMPLE XVIII

Emulsion terpolymer similar to that described in Example IX is prepared, except that the termonomer is N-vinyl-2-pyrrolidone.

EXAMPLE XIX

The latices of Examples I through VII contained about 20% solids. These latices were blended with a 40% solids carboxylated styrene-butadiene (CSB) (60% styrene, 36% butadiene and 4% fumaric acid) latex so that the resulting total solids contained 92% of the CSB latex and 8% of the highly carboxylated polymer. These blends were tested for asbestos sheet manufacture using the procedure described above.

The latex blends show the influence of the methacrylic acid content of the highly carboxylated latex additive upon the asbestos felt performance. The drawing is a plot of cold tensile and stiffness against content of methacrylic acid (and inverse content of ethyl acrylate). The cold tensile with the base carboxylated styrene butadiene latex was 38.4 pounds per inch and the stiffness was 102. As the methacrylic acid content of the additive latex was increased, a significant 50% increase in both tensile strength and stiffness was observed. Other properties, including drainage, were unaffected.

EXAMPLE XX

The latices of Examples VIII through XVIII contained about 20% solids. These latices were blended with a 40% solids CSB (60% styrene, 36% butadiene and 4% fumaric acid) latex so that the resulting total solids contained 4% of the highly carboxylated polymer. Three different commercial strength additives and a carboxylated styrene-butadiene latex without any additive were also tested. The results are shown in the following Table:

Table

| Example | Schopper Riegler (°) | Tensile (lbs/in) | | |
|---|---|---|---|---|
| | | cold | hot | plasticizer |
| VIII | 17.5 | 48.9 | 22.6 | 23.7 |
| IX | 17.3 | 49.0 | 23.0 | 21.4 |
| X | 20.0 | 57.9 | 25.1 | 22.0 |
| XI | 15.0 | 53.6 | 21.0 | 21.3 |
| XII | 15.5 | 53.2 | 20.5 | 21.7 |
| XIII | 15.1 | 54.6 | 20.1 | 20.8 |
| XIV | 15.7 | 56.6 | 22.5 | 23.6 |
| XV | 16.2 | 51.7 | 20.1 | 21.3 |
| XVI | 16.8 | 56.6 | 23.3 | 23.0 |
| XVII | 16.0 | 50.8 | 22.6 | 23.8 |
| XVIII | 18.2 | 50.1 | 21.1 | 22.6 |
| Commercial X Additive* | 23.8 | 55.9 | 20.2 | 24.8 |
| Commercial Y Additive** | 23.4 | 52.6 | 23.0 | 20.4 |
| Commercial Z Additive*** | 20.9 | 51.6 | 22.0 | 22.2 |
| CSB - no additive | 22.0 | 44.6 | 21.2 | 17.0 |

The commercial additives are as follows:
*polyamide-epichlorohydrin resin - Polycup resin available from Hercules Incorporated, Wilmington, Delaware.
**acrylic polymer - Accostrength 862 resin available from American Cyanamid Co.
***Accostrength 100 VKA resin All of the eleven blends according to this invention impart a higher cold tensile strength than the carboxylated styrene butadiene latex without any additive. The average improvement in cold tensile was 18%. Three of the blends—Examples X, XIV and XVI—yielded better than a 25% improvement in cold tensile. Six of the eleven blends according to this invention imparted higher hot tensile than carboxylated styrene butadiene latex without the additive. All eleven blends of this invention gave higher plasticizer tensile than carboxylated styrene butadiene latex without any additive; the average improvement was 22%. Along with the tensile strength increases, there was an average lowering of the Schopper Riegler by 24%. Although tensile strength was improved with the commercial additives, there was no significant improvement in drainage.

What is claimed is:

1. An asbestos sheet comprising asbestos fibers bonded together by a binder prepared from a binder latex blend of a synthetic rubber latex and a highly carboxylated polymer latex with a dispersed phase comprising (1) from about 80 to about 99.5 weight percent of a synthetic rubber, and (2) from about 0.5 to about 20 weight percent of a highly carboxylated polymer containing, as monomers, (a) from about 30 to about 85 parts by weight of an unsaturated carboxylic acid of the formula

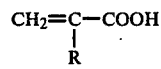

in which R is methyl or ethyl, (b) from about 5 to about 50 parts by weight of an unsaturated carboxylic acid ester of the formula

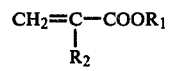

in which $R_1$ is alkyl from 1 to 8 carbob atoms, $R_2$ is hydrogen, methyl or ethyl, and (c) from 0 to about 20 parts by weight of a termonomer different from (a) and (b) of the formula

wherein $R_3$ is hydrogen, methyl, ethyl or halogen, $X_1$ is hydrogen or $C_1$-$C_{18}$ alkoxycarbonyl, and $X_2$ is a member selected from the group consisting of aryl, aminocarbonyl, cyano, $C_1$-$C_4$ alkoxy, carboxy, $C_1$-$C_{18}$ alkoxycarbonyl, halo, acyl, aldehyde, keto, isocyanate, $C_3$-$C_9$ heterocyclic, $C_1$-$C_4$ alkyl, $C_2$-$C_4$ alkenyl, halomethylene, acetomethylene, sulfo, $C_1$-$C_4$ alkoxysilane and hydrogen, said polymer latex having been prepared by inducing in a reactor, at a temperature of from about 5° C. to about 80° C., a redox-initiated polymerization in an aqueous dispersion of said monomers wherein all of the ingredients necessary for the polymerization are present in the reactor upon initiation of the polymerization.

2. An asbestos sheet according to claim 1 in which the synthetic rubber latex is selected from the group consisting of an optionally carboxylated styrene/butadiene latex, an acrylonitrile/butadiene latex and a neoprene latex.

3. An asbestos sheet according to claim 2 in which the synthetic rubber latex is an optionally carboxylated styrene/butadiene latex containing from about 30 to about 85 weight percent of styrene, from about 25 to about 70 weight percent of butadiene, and from 0 to about 5 weight percent of a carboxylic acid selected from the group consisting of acrylic acid, methacrylic acid, fumaric acid and itaconic acid.

4. An asbestos sheet according to claim 1 in which, in the highly carboxylated polymer latex, ingredient (a) is methacrylic acid, and ingredient (b) is methylacrylate or ethylacrylate.

5. An asbestos sheet according to claim 4 in which the highly carboxylated polymer latex is a copolymer of methacrylic acid and ethylacrylate.

6. An asbestos sheet according to claim 5 in which, in the highly carboxylated polymer latex, methacrylic acid is present in an amount ranging from 50 to 80 weight percent and ingredient (b) is present in an amount ranging from 20 to 50 weight percent.

7. An asbestos sheet according to claim 4 in which the highly carboxylated polymer latex is a terpolymer.

8. An asbestos sheet according to claim 7 in which, in the terpolymer, ingredient (a) is present in an amount ranging from 50 to 70 weight percent, ingredient (b) is present in an amount ranging from 20 to 30 percent, and the termonomer ingredient (c) is present in an amount ranging from 3 to 8 percent.

9. An asbestos sheet according to claim 8 in which the termonomer is acrylamide.

10. An asbestos sheet according to claim 8 in which the termonomer is acrylonitrile.

11. An asbestos sheet according to claim 8 in which the termonomer is n-butylvinyl ether.

12. An asbestos sheet according to claim 8 in which the termonomer is chlorostyrene.

13. An asbestos sheet according to claim 8 in which the termonomer is diethylmaleate.

14. An asbestos sheet according to claim 8 in which the termonomer is 2-ethylhexyl halfacid maleate.

15. An asbestos sheet according to claim 8 in which the termonomer is isobutyl vinyl ether.

16. An asbestos sheet according to claim 8 in which the termonomer is styrene.

17. An asbestos sheet according to claim 8 in which the termonomer is triethoxy vinylsilane.

18. An asbestos sheet according to claim 8 in which the termonomer is vinyl acetate.

19. An asbestos sheet according to claim 8 in which the termonomer is N-vinyl-2-pyrrolidone.

* * * * *